Figure 1:
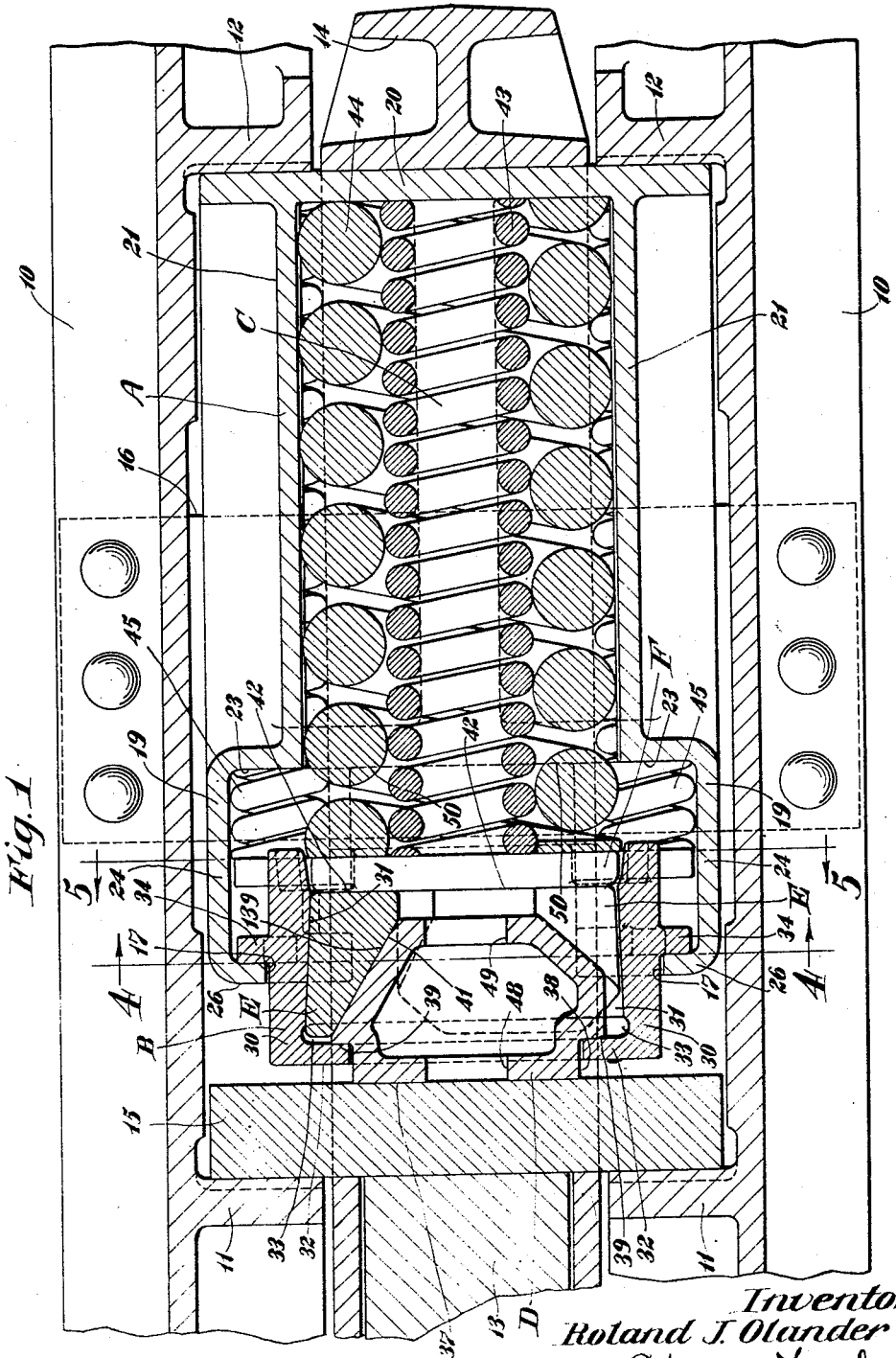

Aug. 1, 1944.　　　R. J. OLANDER　　　2,354,826

FRICTION SHOCK ABSORBING MECHANISM

Filed Jan. 30, 1942　　　4 Sheets-Sheet 1

Inventor
Roland J. Olander
By Henry Fuchs
Atty.

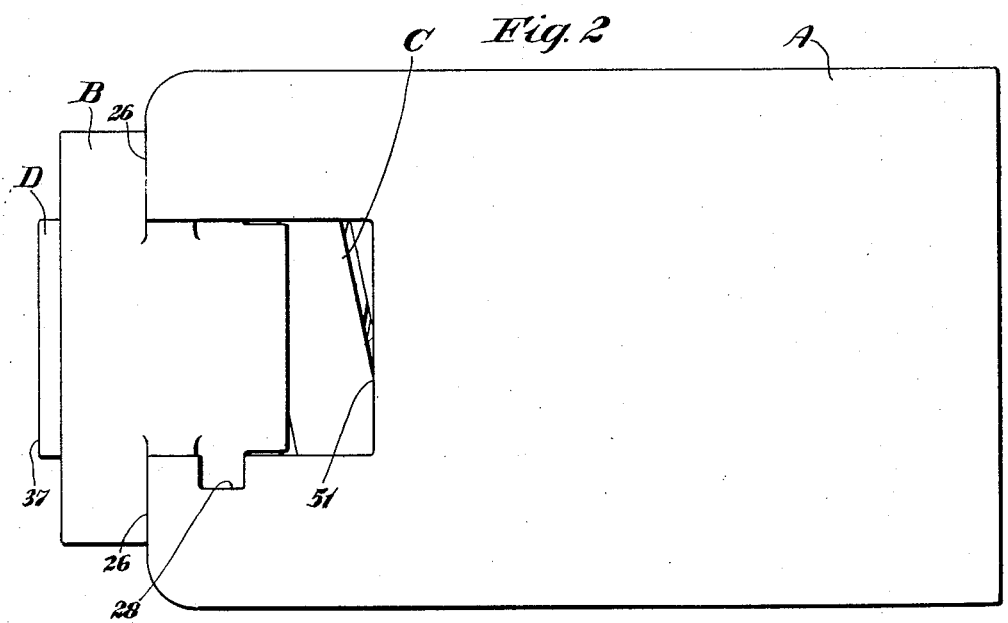
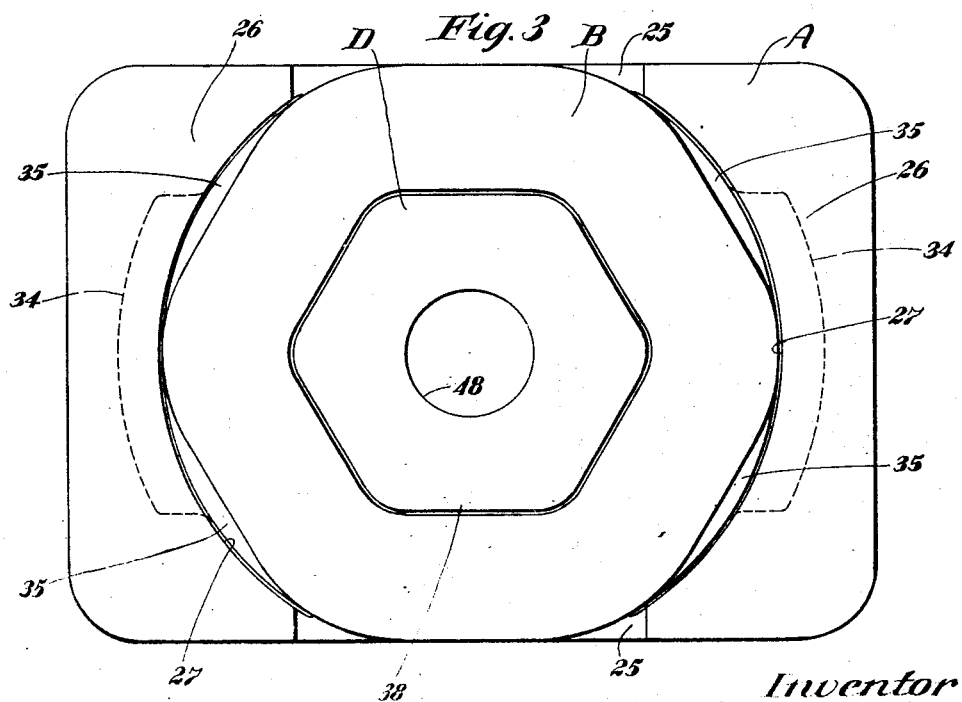

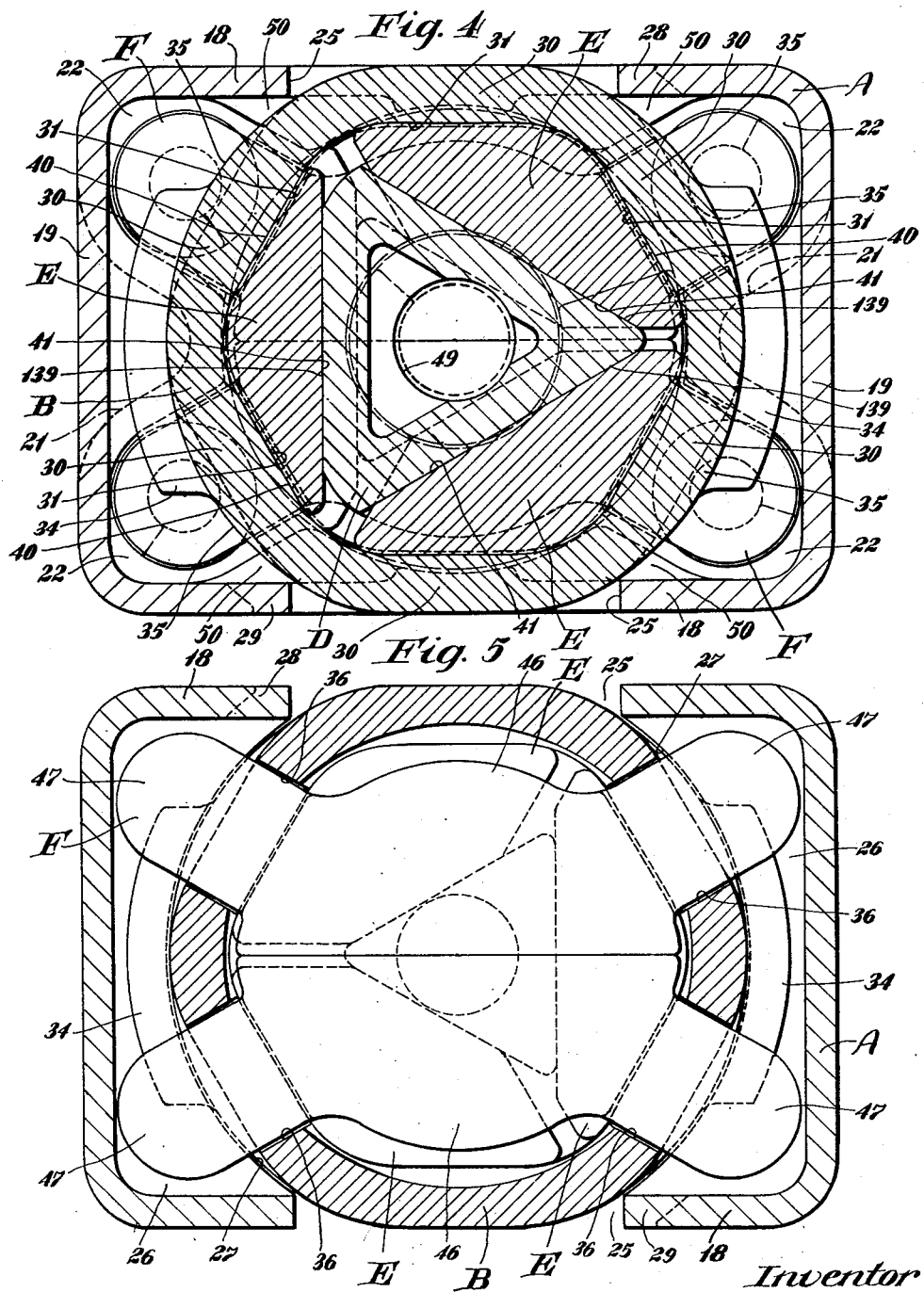

Aug. 1, 1944.　　　R. J. OLANDER　　　2,354,826
FRICTION SHOCK ABSORBING MECHANISM
Filed Jan. 30, 1942　　4 Sheets-Sheet 4
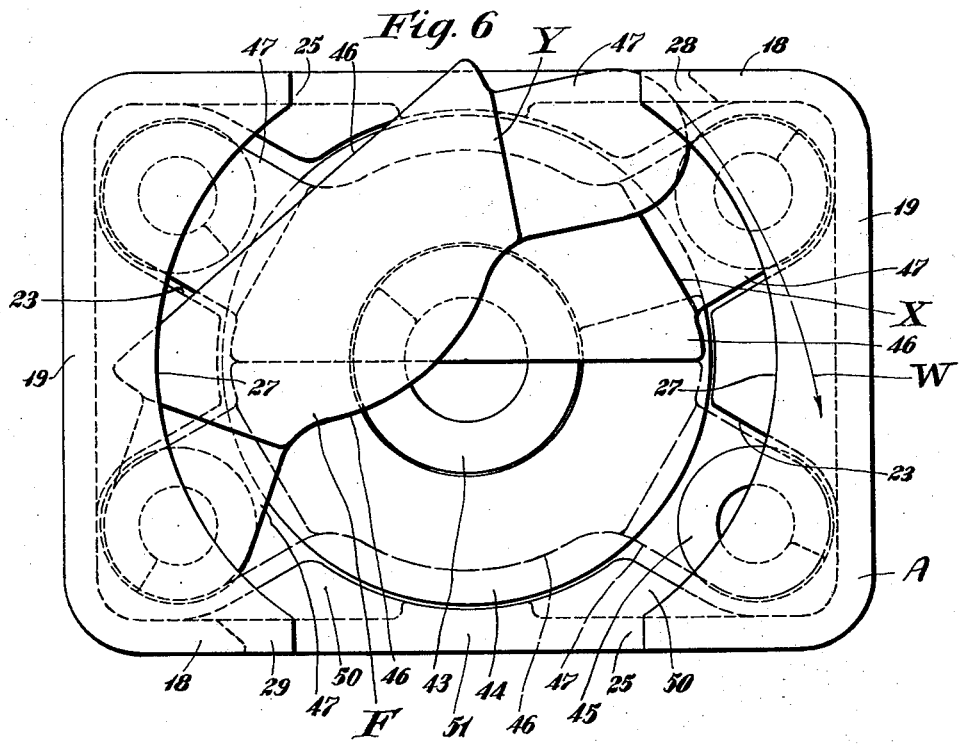
Inventor
Roland J. Olander
By Henry Fuchs
Atty.

Patented Aug. 1, 1944

2,354,826

UNITED STATES PATENT OFFICE 2,354,826

FRICTION SHOCK ABSORBING MECHANISM

Roland J. Olander, Chicago, Ill., assignor to W. H. Miner, Inc., Chicago, Ill., a corporation of Delaware Application January 30, 1942, Serial No. 428,806

8 Claims. (Cl. 213—24)

This invention relates to improvements in friction shock absorbing mechanisms.

One object of the invention is to provide a friction shock absorbing mechanism, especially adapted for railway draft riggings, having high free spring capacity to absorb the usual lighter shocks to which the mechanism is subjected in service, and high frictional resistance to absorb unusually heavy shocks, comprising a spring cage open at its forward end, a friction shell telescoped within the open front end of the cage and having limited movement with respect to the latter, a friction clutch cooperating with the friction shell, spring resistance means within the cage opposing relative movement of the shell and cage and also opposing relative movement of the friction clutch and shell after movement of the latter has been limited, wherein spring follower means which is insertable through the open front end of the cage is employed to transmit the actuating force from the friction shell and friction clutch to the spring resistance means.

A more specific object of the invention is to provide a friction shock absorbing mechanism as set forth in the preceding paragraph wherein the friction shell and spring cage have interengaging means thereon for anchoring the shell to the cage, which anchoring means is brought into operative position by partial relative rotation of the shell and cage, and wherein the spring follower is held against rotation with respect to the cage and is adapted to interlock with means on the shell to hold the latter against rotation when the mechanism is completely assembled and thus prevent accidental detachment of the shell from the cage.

A further object of the invention is to form the spring follower of the mechanism hereinbefore set forth of two similar pieces which when assembled form the complete follower having a cross sectional shape fitting the interior of the spring cage to prevent relative rotation of the follower and cage, the two pieces of said follower being designed to be inserted within the open end of the spring cage in succession and then brought together in assembled position.

Other objects of the invention will more clearly appear from the description and claims hereinafter following.

In the drawings forming a part of this specification, Figure 1 is a horizontal, longitudinal sectional view of a portion of the underframe structure of a railway car, showing the draft sills, and illustrating my improved shock absorbing mechanism in connection therewith. Figure 2 is a top plan view of the shock absorbing mechanism shown in Figure 1. Figure 3 is a front elevational view, on an enlarged scale, of the mechanism shown in Figure 2. Figures 4 and 5 are transverse vertical sectional views, on an enlarged scale, corresponding respectively to the lines 4—4 and 5—5 of Figure 1. Figure 6 is a view similar to Figure 3 with the friction clutch omitted and illustrating the method of assembling the spring follower with the spring cage.

In said drawings 10—10 indicate channel-shaped center or draft sills of a railway car, of well-known design, on the inner sides of which are formed the usual front and rear stop lugs 11 and 12. The inner end portion of the coupler shank is indicated by 13, to which is operatively connected a yoke 14 of well-known design, within which is disposed the improved shock absorbing mechanism proper and a front main follower 15. The yoke, in turn, is supported by the usual detachable saddle plate 16 secured to the draft sills.

My improved shock absorbing mechanism comprises broadly a spring cage A; a friction shell B; a spring resistance C within the cage A; a wedge block D; three friction shoes E—E—E; and a two-piece spring follower F.

The spring cage A is in the form of a substantially rectangular boxlike casing open at its front end, as indicated at 17, and having vertically spaced top and bottom walls 18—18, laterally spaced side walls 19—19, and a vertically disposed transverse wall 20 closing the rear end of the casing. The side walls 19—19 are bowed inwardly or indented between the top and bottom of the casing, as indicated at 21. The inwardly bowed or indented portions 21 extend lengthwise of the casing from a point spaced rearwardly from the open front end of the casing to the rear wall 20 of the same. Spring pockets 22—22—22—22 are thus provided at the four corners of the casing. Transverse wall portions 23—23 merging with the front ends of the wall portions of the indentations 21—21 of the side walls provide abutments or limiting stops. At the top and bottom the casing A is provided with transverse stop webs 50—50, as most clearly shown in Figure 4, the front faces of which are in alignment with the stops 23—23. The section or portion of the cage A forwardly of the abutments or stops 23—23 is of substantially rectangular cross section and is designated by 24. The top and bottom walls 18—18 of the section 24 are centrally cut away, as shown, thus providing longitudinally extending, relatively wide, top and bottom openings 25—25 in the section 24 of the casing, which openings extend the full length of said section 24. The inner end walls 51 of the openings 25—25 are in alignment with the front faces of the stops 23 and webs 50. The stops 23, webs 50, and the inner end walls of the openings 25 form abutments which restrict inward movement of the friction shell, as hereinafter pointed out. At the open front end of the cage A, the top, bottom, and side walls thereof are provided with inturned, laterally extending flanges 26—26 which have their inner edges curved, as indicated at 27—27. The curved edges 27—27 are concentric, as shown. At a point spaced inwardly from the front end of the casing the top wall 18 of the section 24 of the casing is slotted at one side of the opening 25, as indicated at 28. The bottom wall 18 of the section 24 is similarly slotted, as indicated at 29, at the opposite side of said opening 25. The rear wall 20 of the casing A protrudes outwardly beyond the inset portions of the top, bottom, and side walls of said casing, as clearly shown in Figure 1, thus providing a rear follower portion of substantially rectangular outline integral with the casing. This follower portion forms the rear follower of the draft rigging and cooperates with the rear stop lugs 12—12 in the usual manner.

The friction shell B is in the form of a hollow sleeve of hexagonal transverse cross section and is telescoped within the open front end of the cage A. The six walls of the hexagonal shell B, which are respectively indicated by 30, are arranged symmetrically about the central longitudinal axis of the mechanism with two opposed walls forming the top and bottom walls which are disposed horizontally. The interior sides of the walls 30 of the shell B present six friction surfaces 31—31—31—31—31—31. The friction surfaces 31 converge rearwardly of the mechanism, as shown in Figure 1, thereby providing an inwardly tapered shell portion. At the forward end, the shell B is provided with a continuous retaining flange 32 directed inwardly from the six walls of the shell. These flanges form retaining means for the wedge member or block D of the device, as hereinafter described. As shown in Figure 1, a certain amount of clearance is provided between the flanges 32—32 and the front ends of the friction surfaces 31—31 of the shell, the interior faces of the walls 30—30 of the casing being slightly recessed at this point, as indicated at 33—33.

At opposite sides, between the front and rear ends thereof, the shell B is provided with laterally, outwardly projecting retaining flanges 34—34 which engage in back of the flanges 26—26 at the front end of the cage A to restrict outward movement of the shell. As shown most clearly in Figures 3, 4, and 5, the flanges 34—34 are of arc-shaped form and are of substantially such a thickness and have their outer edges curved on the arc of a circle of such a diameter that the same will freely pass through the slots 28 and 29 of the top and bottom walls of the front end section of the spring cage. At said flanges 34—34 the adjacent wall portions of the shell B are thickened, as indicated at 35—35, to provide ribs which merge with the bases of the flanges 34—34 to reenforce the same. The outer edge faces of the ribs 35—35 are curved and are concentric with the curved inner edges 27—27 of the flanges 26—26 of the cage A. Sufficient clearance is provided between the ribs 35—35 and the edges 27—27 to permit free in and out movement of the shell B.

At each side of the shell B at the inner end thereof the walls are recessed or slotted, as indicated at 36—36 and 36—36. The slots 36 are radially disposed and form seats to accommodate certain locking wings on the spring follower hereinafter more fully described.

The wedge D is in the form of a hollow block having a flat transverse front end face 37 adapted to bear on the inner side of the front follower 15 of the draft rigging. The front end portion or section of the block D, which is indicated by 38, is of reduced size, thereby providing an annular shoulder 39 immediately to the rear of the section 38 adapted to engage in back of the flange 32 of the shell B to limit outward movement of the block and hold the same assembled with the shell. The section 38 is of hexagonal shape, as clearly shown in Figure 3, and loosely extends through the open front end of the shell B so that it moves freely in said opening. At its inner end the block D is provided with three flat wedge faces 139—139—139 which are arranged symmetrically about the longitudinal central axis of the mechanism.

The friction shoes E, which are three in number, are arranged within the friction shell B and surround the wedge D. Each shoe has an outer friction surfaces 40 of V-shaped cross section cooperating with two adjacent friction surfaces 31—31 of the shell. On the inner side each shoe is provided with a flat wedge face 41 correspondingly inclined to the opposed wedge face 139 of the block D and engaged therewith. At the inner end each shoe is provided with a flat transverse face 42 adapted to bear on the spring follower F.

The spring resistance C comprises an inner coil 43, a surrounding relatively heavier outer coil 44, and four additional coils 45—45—45—45 disposed about the inner and outer coils and located at the four corners of the casing A within the spring pockets 22—22—22—22. The spring coils 43, 44, and 45 of the spring resistance have their front and rear ends bearing respectively on the spring follower F and the rear wall 20 of the cage A.

The spring follower F is centrally divided, as most clearly shown in Figure 5, comprising two platelike members 46—46 of the outlines shown in said figure. The platelike members 46—46 are of like design, each having a pair of wings or lugs 47—47 extending from the main body thereof. The two piece spring follower F is thus provided with four wings or lugs 47—47—47—47. This spring follower, as most clearly shown in Figure 1, is interposed between the spring resistance C and the friction clutch comprising the wedge D and the shoes E—E—E, and has the wings or lugs 47—47—47—47 thereof respectively in alignment with the openings or slots 36—36—36—36 of the shell B. In the normal full release position of the parts of the mechanism, the wings 47 are engaged within and extend through the slots 36, loosely fitting the latter so that the spring follower is movable inwardly of the mechanism with respect to the friction shell B. As shown in Figure 5, the wings 47 of the spring follower extend into the four corners of the casing A and thus cooperate with the walls of the latter to limit rotation of the spring follower within the cage and, in effect, hold the former against angular displacement about the central longitudinal axis of the mechanism. Inasmuch as the wings 47 are engaged within the slots 36 of the friction shell B, the latter is locked against rotation with respect to the cage or casing A by said spring follower.

The four outer coils 45—45—45—45 of the spring bear respectively on the wings 47—47—47—47 of the spring follower, and the coils 43 and 44 bear on the main body portion of the same. As will be evident from Figure 6, each spring follower section 46 including the wings 47—47 thereof is of such an overall length from the extremity of the wing at one side of the same to the extremity of the wing on the other side thereof that the wings 47—47 will pass freely through the slots 28—29 of the section 24 of the cage A when the spring follower section is moved edgewise through said slots and given a rotary movement.

As shown in Figure 1, in the normal full release position of the mechanism, the spring follower F is located to the rear of the slots 28 and 29, so that in assembling the mechanism the section of the spring follower first assembled with the cage A may be displaced rearwardly to permit entering the second section thereof through the slots 28 and 29.

In assembling the mechanism the spring resistance C comprising the inner and outer coils 43 and 44 and the four coils 45 is first placed within the casing A by passing the same into said casing through the open front end thereof. The sections 46—46 of the spring follower F are then placed within the casing in succession. Referring to Figure 6, the section which is first assembled with the casing A is passed into the open front end of the same while in vertical position with the wings 47—47 aligned with the top and bottom openings 25—25. This section is moved rearwardly until the wings 47—47 are aligned with the slots 28 and 29 and is then rotated or displaced angularly to the horizontal position shown at $x$ in Figure 6, the wings 47—47 passing through the slots 28 and 29. This section is then bodily displaced rearwardly beyond the slots 28—29 to permit assembling of the second section 46 within the casing. The second section 46 is then placed within the casing A in the same manner as the first section, the character $y$ in Figure 6 indicating the position of said section as it is being rotated to pass the wings thereof through the slots 28 and 29. From the position $y$ shown in Figure 6, this second section is rotatably displaced as indicated by the arrow $w$ until it reaches the horizontal position wherein it will match with the follower section 46 first applied to form the complete two piece follower. As will be evident this completely assembled condition of the follower is produced when the second section has been forced rearwardly into transverse alignment with the first section.

The friction shell B with the friction clutch comprising the wedge D and the three shoes E—E—E assembled therewith is then applied to the casing A. In applying these assembled parts, the shell B is first axially aligned with the cage A with the flanges 26—26 of the former registering with the top and bottom openings 25—25 respectively of the cage. The spring follower F is then forced rearwardly by a tool, preferably in the form of a plunger or bar projected through the central openings 48 and 49 provided in the block D for this purpose, and held in fixed position by said tool. The friction shell B is then moved inwardly of the casing until the flanges 34—34 are in transverse alignment with the slots 28 and 29 of the cage A. The shell is then rotated about the central longitudinal axis of the mechanism through an angle of substantially 90° to bring the same to the position shown in Figures 3, 4, and 5, the flanges 34—34 passing through the slots 28—29. In this connection it is pointed out that during this assembling operation the spring follower is held in such a position that it clears the inner end of the shell. In the position shown in Figures 3, 4, and 5, the slots or openings 36—36 at the rear end of the shell B register with the wings 47—47 of the spring follower F, and when the latter is released by withdrawing the holding tool or plunger, the springs of the spring resistance C will force the spring follower forwardly or outwardly to the position shown in Figure 1, bringing the lugs or wings 47 of the spring follower into locking engagement with the shell B and forcing the latter outwardly by engagement of the spring follower with the shoes E of the friction clutch, thereby bringing the flanges 34 into engagement with the retaining flanges 26 of the cage A.

The operation of my improved shock absorbing mechanism is as follows: In a draft action the casing A is pulled forwardly by the yoke 14, compressing the mechanism against the front follower 15. In a buffing action the follower 15 is moved rearwardly or inwardly by the coupler shank 13, thereby compressing the mechanism against the rear stop lugs 12—12, the casing being held against rearward movement during this action by said stop lugs. Thus, upon compression of the mechanism in either draft or buff, the wedge block D will be forced inwardly toward the spring cage A. Due to the resistance offered by the springs 43, 44, and 45—45—45—45, comprising the spring resistance C, a wedging action is set up between the wedge D and the shoes E—E—E, thereby forcing the shoes into frictional contact with the interior friction surfaces of the shell B. Due to the friction thus created the shell B is compelled to move inwardly of the casing A in unison with the wedge D. During this movement all of the springs of the spring resistance C will be compressed, thereby absorbing the lighter shocks to which the mechanism is subjected in service. Thus, during initial compression of the mechanism free spring action of the entire spring resistance is had. This action continues until inward movement of the shell B is arrested by engagement of the same with the stop shoulders 23, 50, and 51 of the cage A, whereupon the wedge and the friction shoes are forced to move inwardly of the shell B against the resistance of all of the springs of the spring resistance F. High frictional resistance is thus had during the last part of the compression stroke of the mechanism. Compression of the mechanism is thus ultimately limited by engagement of the front follower 15 with the front end of the cage A, whereupon the force is transmitted through the cage A to the rear stop lugs, the cage acting as a solid column to transmit the load and relieve the springs of the shock absorbing mechanism from undue strain.

When the actuating force is reduced the parts are returned to the normal position shown in Figures 1 and 2 by the spring resistance C acting through the spring follower F, outward movement of the shell B being limited by shouldered engagement with the flanges 26 of the cage A, and outward movement of the wedge D being in turn limited by shouldered engagement thereof with the flanges 32 of said shell.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage open at one end, said cage having laterally inwardly overhanging diametrically opposite flanges at opposite sides of said open end, said flanges being interrupted at the top and bottom of the cage to provide recesses; of a friction shell telescoped within the open end of said cage between said stop flanges, said shell having radial lugs engageable in back of the shoulders of the cage to limit outward movement of the shell, said lugs being of lesser width than the recesses at the top and bottom of the cage to freely enter said recesses when aligned therewith, said shell being rotatable about its longitudinal axis with respect to the cage to displace said lugs of the shell from said aligned position to a postion in back of said flanges of the cage; a friction clutch slidable within the shell; a spring follower within the cage locked against rotation with respect to the cage; interengaging locking means on said spring follower and shell for holding said shell against rotation with respect to the cage to prevent disengagement of said lugs from said shell flanges; and spring resistance means holding said spring follower in locking engagement with the shell.

2. In a friction shock absorbing mechanism, the combination with a spring cage open at the front end, said cage having inturned arcuate stop flanges at opposite sides of said open end, said flanges being cut away at the top and bottom of the cage; of a friction shell of a size to telescope within the open end of said cage, said shell having radial stop lugs at opposite sides of the rear end thereof, said stop lugs being of lesser width than said cut away portions of the flanges of the cage; a friction clutch slidable within the shell; a spring resistance within the cage; and a spring follower, the rear end of the friction shell being adapted to be telescoped within the open end of the spring cage when said lugs of the shell are brought into alignment with the cut away portions of the flanges of said cage, said lugs being adapted to be brought in back of said flanges of the cage while the shell is in said telescoped condition by rotation of said shell about its axis, said shell in said last named position having its outward movement limited by engagement of said lugs with said flanges, said spring follower being interposed between the friction clutch and spring resistance, said spring follower being held against rotation with respect to the cage and having means thereon interlocking with the shell in said last named position to hold the latter against rotation with respect to the cage.

3. In a friction shock absorbing mechanism, the combination with a spring cage open at the front end; of a friction shell telescoped within the open end of said cage, said shell and cage being connected by a bayonet joint, including inturned stop flanges on the cage and having laterally projecting stop lugs on the shell engageable in back of said stop flanges to limit outward movement of the shell; a friction clutch slidable within the shell; a spring resistance within the cage; and a spring follower interposed between the friction clutch and spring resistance, said spring follower and shell having interlocking lugs and slots to hold said shell and follower against relative rotation, said spring follower interfitting with the cage to limit relative rotary movement of said follower with respect to the cage.

4. In a friction shock absorbing mechanism, the combination with a spring cage open at one end; of a friction shell telescoped within the open end of said cage, said shell and cage having interengaging bayonet joint anchoring means providing lost motion in a direction lengthwise of the mechanism, said shell having radially disposed slots at the rear end; a friction clutch slidable within the shell; a spring follower bearing on the friction clutch and having radially disposed locking wings engaged within and extending through said slots of the shell to lock said shell against rotation with respect to the spring follower, said wings being engageable with the interior walls of the cage to limit rotation of said spring follower; and spring resistance means within the cage holding said spring follower against the clutch and the wings of said spring follower engaged in the slots of the shell.

5. In a friction shock absorbing mechanism, the combination with a spring cage of substantially rectangular transverse cross section open at one end; of a friction shell telescoped within the open end of the cage, said cage and shell having interengaging stop shoulders to limit outward movement of the shell with respect to the cage, said shell normally having the stop shoulders disposed in longitudinal alignment with, and in back of, the stop shoulders of the cage, said shell having radially disposed, rearwardly opening slots at the rear end thereof; a friction clutch slidable within the shell; spring resistance means within the cage; and a spring follower interposed between said spring resistance and the friction clutch, said spring follower having radially extending wings engaged within said slots and extending through the same into the corners of the cage to cooperate with the walls of said cage at said corners to limit rotary displacement of the spring follower said follower when forced inwardly away from the friction shell being disengaged therefrom to permit rotation of the shell about its longitudinal axis to bring the shoulders thereof out of alignment with the shoulders of the cage to permit disengagement and separation of the shell from the cage.

6. In a friction shock absorbing mechanism, the combination with a spring cage having an open front end portion of substantially rectangular cross section defined by top, bottom and side walls; of inturned flanges at the open front end of said cage on the side walls thereof, the top and bottom walls of said cage having aligned top and bottom central openings extending inwardly from the open end of the cage, one side wall of one of said openings and the opposite side wall of the opposite of said openings being notched at a point inwardly of the inturned flanges, said notches being cut out of said walls of said upper and lower openings on a radius taken about the longitudinal axis of the spring cage; a friction shell having diametrically disposed side flanges of widths less than said openings and of such depths as to pass freely through said notches, said side flanges being engaged in back of the inturned flanges of the cage to limit outward movement of the shell, said shell having four spaced, radially disposed, rearwardly opening slots at the rear end, said slots being respectively directed toward the four corners of the cage; a friction clutch slidable within the shell; spring resistance means within the cage; and a centrally divided two piece spring follower within the cage interposed between the friction clutch and spring resistance means, each section of said two piece spring follower having two radially disposed wings, one at each side thereof extending through the corresponding slots of the shell and into the corresponding two corners of the cage.

7. In a friction shock absorbing mechanism, the combination with a spring cage having an open front end portion of substantially rectangular cross section defined by top, bottom and side walls, said top and bottom walls having central openings extending inwardly from the front end of the cage; of laterally inwardly extending stop flanges at the front ends of said side walls the inner edges of said flanges being spaced apart to provide an opening therebetween of lesser width than the interior width of the cage; a friction shell telescoped within the front end of the cage between said flanges, and having laterally outwardly projecting retaining lugs at opposite sides thereof engaged in back of said stop flanges to limit outward movement of the shell; a friction clutch slidable within the shell; springs within the cage; and a centrally divided two piece spring follower interposed between the clutch and springs, said spring follower having lugs at the corners of the cage projecting into said corners to hold said spring follower against rotation about the longitudinal axis of the cage each of the sections of said spring follower being of a size to be passed in edgewise position through either said central top or bottom opening of the cage in assembling the spring follower with the cage, said spring follower and shell having interlocking means thereon for holding the same against relative rotation.

8. In a friction shock absorbing mechanism, the combination with a spring cage open at one end and having top, bottom and side walls; of laterally, inwardly extending stop flanges on said side walls at the open end of the cage; a friction shell telescoped within the open end of the cage, said shell having stop lugs engaged in back of said flanges to limit outward movement of the shell; a friction clutch within the shell; spring resistance means within the cage; and a spring follower within the cage interposed between the spring resistance and friction clutch, said spring follower being diametrically divided into two equal sections to facilitate assembling of the same within the cage, said spring follower being confined under pressure of said spring resistance between said clutch and spring resistance to hold the sections of the spring follower in side by side assembled relation, said assembled spring follower being of a shape to interfit with the interior of the cage and prevent rotation of the same within the cage, said spring follower and shell having interengaging means thereon to lock the same together against relative rotation about the longitudinal axis of the mechanism.

ROLAND J. OLANDER.